No. 848,600. PATENTED MAR. 26, 1907.
M. VON PIRANI.
PRODUCTION OF HOMOGENEOUS BODIES FROM TANTALUM OR OTHER METALS.
APPLICATION FILED OCT. 4, 1906.
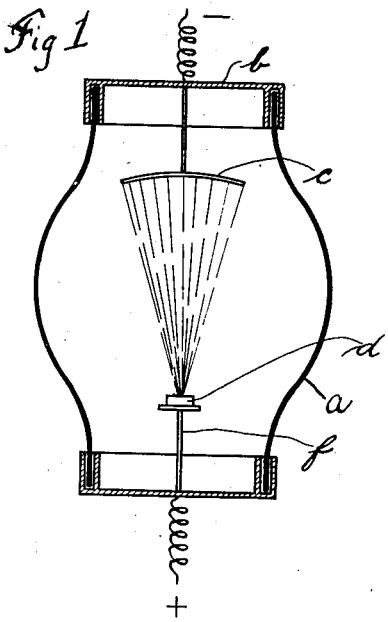
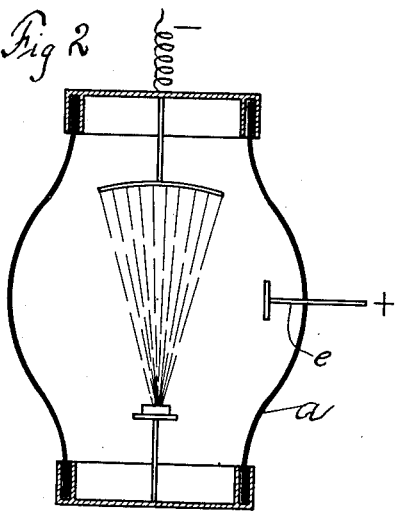
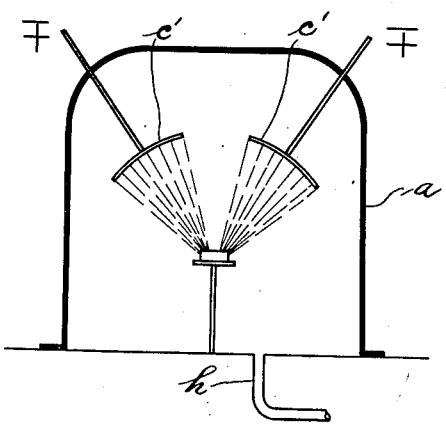

UNITED STATES PATENT OFFICE.

MARCELLO VON PIRANI, OF WILMERSDORF, BERLIN, GERMANY, ASSIGNOR TO SIEMENS & HALSKE A.-G., OF BERLIN, GERMANY, A CORPORATION OF GERMANY.

PRODUCTION OF HOMOGENEOUS BODIES FROM TANTALUM OR OTHER METALS.

No. 848,600.　　　Specification of Letters Patent.　　Patented March 26, 1907.

Application filed October 4, 1906. Serial No. 337,427.

*To all whom it may concern:*

Be it known that I, MARCELLO VON PIRANI, a subject of the King of Italy, and a resident of Wilmersdorf, Berlin, Germany, have invented a new and useful Production of Homogeneous Bodies from Tantalum or other Metals which are Fusible with Difficulty, of which the following is a specification.

The present invention relates to the production of homogeneous bodies of refractory metals.

Formerly a method was employed in accordance with which the metal powder, which was produced in any suitable manner, was in the first place united to form a sufficiently-solid body by pressing it together or by other suitable means. An electric current was then conducted through the body in vacuum or in an indifferent atmosphere until it was heated to melting-point, an arc being preferably formed between the metal to be fused and an opposite electrode.

In the method according to the present invention the metal is fused by the action of cathode-rays, and in order that the method may be more clearly understood reference is made to the accompanying drawings, in which several forms of apparatus suitable for carrying the method into effect are shown by way of example, and in which—

Figure 1 is a vertical section through one form of such apparatus. Fig. 2 is a vertical section through another form, and Fig. 3 shows another form diagrammatically.

Referring to Fig. 1, the glass vessel $a$ is closed by means of metal covers $b$ at two opposite ends, said covers being perfectly tightly cemented onto the edges of the vessel. The upper cover, which serves as cathode, carries a reflector-shaped cathode-ray emitter $c$, in the focus of which the metal $d$ lies which is to be melted and which is connected with the anode $e$. The vessel $a$ is exhausted of air to the extent required for cathode radiations. The metal, which is preferably triturated before being placed in the vessel, is melted exceedingly quickly under the action of the cathode-rays. The brush of cathode-rays may easily be moved from the outside with the aid of a magnet in such a way that all parts of the material to be melted are successively struck by the cathode-rays. The method according to the present invention is therefore essentially simpler and more certain than the methods known hitherto, as no kind of mechanical device is required to be present inside the vacuum-furnace which would have to be operated from the outside if such existed. It may, moreover, also be pointed out that the method according to the present invention proves essentially clean, and the possibility of treating the metals in such a way that a perfectly pure and above all a ductile body is formed is much more readily attained. A further advantage is that the electric energy is utilized very much more economically in this method by means of cathode-rays, so that only a fraction of the expenditure of energy is necessary for melting the metal as compared with that required in the methods which were formerly employed.

In the method according to the present invention it is not necessary to connect the metal to be melted with the anode. On the other hand, it is of course also permissible to arrange the anode in any other suitable manner, as, for example, is represented in Fig. 2. In this form of apparatus the metal $d$ is placed on the stand $f$ and has directed upon it the rays from cathode $c$, the anode being arranged in the side of the vessel $a$.

The method according to the present invention may also be carried out with high-tension alternating-current of, for example, fifty thousand to two hundred thousand volts. Under certain circumstances the one of the two electrodes is in this case exclusively employed as cathode, the entire apparatus working similarly to a redresser or rectifier; but under some circumstances both electrodes may also alternately emit cathode-rays. In that case in order to bring both electrodes into action the arrangement as represented in Fig. 3 is a preferable one, in which both the electrodes $c'$ are formed like reflectors and are arranged in such a way that the metal to be melted lies in the focus of each of the electrodes. The metal is placed on the stand $f$ and the gas is exhausted by suitable means through outlet-tube $h$ to prevent arc formation and recombining of the gas with the metal. In some cases the metal being treated may not contain any impurities. In this case the metal would only have to be melted and the vacuum-pump would not be absolutely necessary, as the apparatus could be closed up tightly without fear of diminishing the vacuum during the melting process. This latter arrangement is also of value when the apparatus is worked under conditions in which the apparatus allows current to pass in only one direction, because then the electrode which forms the cathode is constantly in the correct position.

What I claim as my invention, and desire to secure by Letters Patent, is—

1. The method of producing homogeneous bodies of refractory metal, which consists in inclosing the metal in a suitable vessel, excluding air from said vessel, and directing cathode-rays upon said metal until it is fused and rendered homogeneous.

2. The method of producing homogeneous bodies of refractory metal, which consists in inclosing the metal in a suitable vessel, excluding air from said vessel, and focusing cathode-rays upon said metal until it is fused and rendered homogeneous.

3. A method of producing homogeneous bodies of refractory metal, consisting in inclosing the metal in a vessel containing a cathode-ray emitter, in exhausting air from said vessel, and in focusing cathode-rays on to said metal whereby the same is fused.

4. A method of producing homogeneous bodies of refractory metal, consisting in inclosing the metal in a vessel containing a plurality of cathode-ray emitters, in exhausting air from said vessel, and in focusing a plurality of cathode-ray brushes on to said metal whereby the same is melted.

5. A method of producing homogeneous bodies of refractory metal, consisting in inclosing the metal in a vessel containing a plurality of ray-emitters, in connecting the same with a source of high-tension alternating current, in exhausting air from said vessel, and in focusing the brushes from said emitters on to said metal whereby the same is fused.

6. The method of producing homogeneous bodies of refractory metal, which consists in triturating the metal, inclosing the triturated metal in a suitable vessel, excluding air from said vessel, and directing cathode-rays on said triturated metal until it is fused and rendered homogeneous.

7. The method of producing homogeneous bodies of refractory metal, which consists in triturating the metal, inclosing the triturated metal in a suitable vessel, excluding air from said vessel, and focusing cathode-rays on said triturated metal until it is fused and rendered homogeneous.

8. The method of producing homogeneous bodies of refractory metal, which consists in triturating the metal, inclosing the triturated metal in a suitable vessel, maintaining said vessel exhausted of air and other gases, and directing cathode-rays upon said triturated metal until it is fused and rendered homogeneous.

9. The method of producing homogeneous bodies of refractory metal, which consists in triturating the metal, inclosing the triturated metal in a suitable vessel, maintaining said vessel exhausted of air and other gases, and focusing cathode-rays upon said triturated metal until it is fused and rendered homogeneous.

In testimony whereof I have signed my name to this specification in the presence of the two subscribing witnesses.

MARCELLO VON PIRANI.

Witnesses:
 WOLDEMAR HAUPT,
 HENRY HASPER.